July 4, 1972  G. L. TOMS  3,674,529
PIGMENTS

Filed Sept. 8, 1970  2 Sheets-Sheet 2

INVENTOR
GERALD LANCE TOMS
BY
Cushman, Darby & Cushman
ATTORNEYS

United States Patent Office 3,674,529
Patented July 4, 1972

3,674,529
PIGMENTS
Gerald Lance Toms, Cornwall, England, assignor to English Clays Lovering Pochin & Company Limited, Cornwall, England
Filed Sept. 8, 1970, Ser. No. 70,114
Claims priority, application Great Britain, Sept. 9, 1969, 44,561/69
Int. Cl. C09c 1/02, 1/28
U.S. Cl. 106—306         14 Claims

ABSTRACT OF THE DISCLOSURE

A method of preparing a mixed pigment which comprises blending together (a) an aqueous suspension of a deflocculated calcium carbonate pigment, and (b) an aqueous suspension of a flocculated clay pigment, and dewatering the blended aqueous suspensions to obtain a cake of the desired mixed pigment.

BACKGROUND OF THE INVENTION

Figure 1:
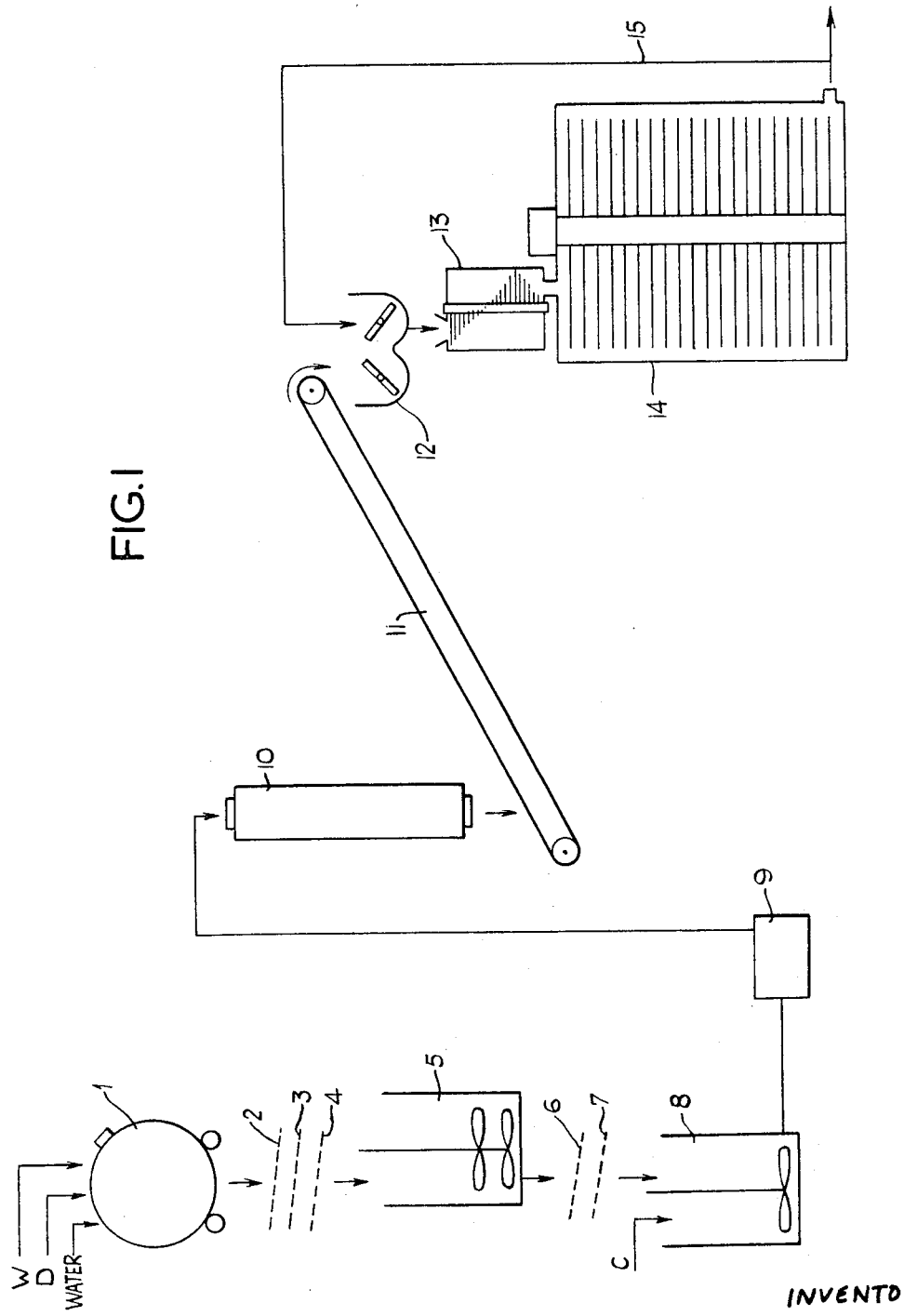

This invention relates to pigments and, more particularly, is concerned with a mixed calcium carbonate/clay pigment suitable for use in, for example, paper coating compositions, paints, rubbers and plastics materials.

It is known to produce a deflocculated aqueous suspension of a pigment, for example a kaolinitic clay pigment or a calcium carbonate pigment, and to spray-dry the deflocculated aqueous suspension of the pigment in order to obtain small spherical particles of the pigment which are free-flowing and are easy to redisperse in water for incorporation in, for example, a paper coating composition, such a material being known as a pre-dispersed pigment. It is also known to prepare a pre-dispersed mixed pigment, which comprises a mixture of a kaolinitic clay pigment and a calcium carbonate pigment, by spray-drying a deflocculated aqueous suspension of the two pigments. Such a mixed pigment combines the good optical properties of the kaolinite clay with the good rheological properties of the calcium carbonate. It is found, however, that the cost of manufacturing such a pre-dispersed mixed pigment is high. Moreover, a spray-dried mixed pigment is difficult to handle and transport because it is in the form of small spherical particles which are very free-flowing and cannot therefore be handled easily by mechanical grabs, etc. The spherical particles are also very light and are blown about by even the lightest wind causing a dust problem. The spray-dried mixed pigment may be handled by pneumatic conveying apparatus but the capital and power costs of such apparatus are high, and the spherical particles tend to be broken during pneumatic conveying which renders them much less amenable to pneumatic conveying a second time.

SUMMARY OF THE INVENTION

It has now been found, surprisingly, that by blending together a deflocculated aqueous suspension of a calcium carbonate pigment and a flocculated aqueous suspension of a clay pigment, dewatering the blended aqueous suspensions to obtain a cake comprising a mixture of the calcium carbonate pigment and the clay pigment, and optionally drying the cake, there is obtained a mixed calcium carbonate/clay pigment which can be readily dispersed in water and which can be used to form, for example, a paper-coating composition having good optical and rheological properties.

More particularly, in accordance with the present invention there is provided a method of preparing a mixed calcium carbonate/clay pigment which comprises blending together (a) a deflocculated aqueous suspension of a calcium carbonate pigment, said aqueous suspension containing a dispersing agent for the calcium carbonate pigment, and (b) an aqueous suspension of a clay pigment, said aqueous suspension of the clay pigment having a pH not greater than 6.5 whereby the clay pigment is flocculated, and dewatering the blended aqueous suspensions to obtain a cake of the desired mixed calcium carbonate/clay pigment.

DESCRIPTION OF THE PREFERRED EMBODIMENTS

The calcium carbonate pigment can take the form of chalk whiting, ground marble or calcite, or chemically precipiated calcium carbonate. Preferably, the calcium carbonate pigment has a particle size distribution such that from 65% to 95% by weight thereof consists of particles smaller than 2 microns equivalent spherical diameter, not more than 10% by weight thereof consists of particles larger than 10 microns equivalent spherical diameter and not more than 1% by weight thereof consists of particles larger than 53 microns equivalent spherical diameter.

Preferably, the deflocculated aqueous suspension of the calcium carbonate pigment comprises not more than 75% by weight of solids and not less than 60% by weight of solids. The preferred dispersing agents are non-mucilaginous water-soluble salts comprising macromolecular, e.g. polymeric, anions having number average molecular weights in the range of from 100 to 10,000. Examples of preferred dispersing agents are sodium, potassium and ammonium polyacrylates, sodium, potassium and ammonium polymethacrylates and sodium salts of the sulphonated condensation products of naphthalene and formaldehyde, the polymeric anion having in each case a number average molecular weight in the range 100 to 10,000. Other dispersing agents which can be used include lignosulphonates having average molecular weights in the specified range. Preferably, the amount of dispersing agent used lies in the range 0.1 to 1.0% by weight based on the weight of dry calcium carbonate pigment.

The deflocculated aqueous suspension of the calcium carbonate pigment is advantageously obtained by grinding a natural calcium carbonate mineral, in aqueous suspension, in the presence of the dispersing agent until the desired particle size distribution is obtained. Advantageously, there is used a raw natural chalk whiting which is first subjected to a preliminary grinding process in aqueous suspension in a pebble mill, in order to separate hard particles of flint therefrom. Whether or not such a preliminary grinding process is performed, the natural chalk whiting is then preferably ground in aqueous suspension with a grinding medium comprising sand, or small pebbles, having a particle size in the range of from No. 100 mesh B.S. sieve to ½ inch. Advantageously, the chalk whiting is ground until it has a particle size distribution such that from 75% to 95% by weight thereof consists of particles smaller than 2 microns equivalent spherical diameter.

The clay pigment is advantageously a kaolinitic clay which can take the form of kaolin, sometimes known as china clay. Preferably, the kaolinitic clay pigment has a particle size distribution such that from 50% to 90% by weight thereof consists of particles smaller than 2 microns equivalent spherical diameter, not more than 15% by weight thereof consists of particles larger than 10 microns equivalent spherical diameter, and not more than 0.05% by weight thereof consists of particles larger than 53 microns equivalent spherical diameter. Other clay pigments which can be used include halloysite, dickite and nacrite.

The aqueous suspension of clay pigment preferably comprises not less than 10% and not more than 30% by weight of solids. The aqueous suspension of the clay pigment should have a pH not greater than 6.5 in order to ensure that the clay is flocculated. Preferably, the pH of the aqueous suspension is adjusted to lie in the range 2.5 to 5.5. An aqueous suspension of a flocculated kaolinitic clay is advantageously obtained by purifying a raw kaolinitic clay, e.g. kaolin, subjecting the purified clay, after deflocculation, to a particle size classification process, e.g. by centrifugal or gravitational sedimention, thickening the fine particle fraction by gravitational sedimentation in the presence of a mineral acid, e.g. sulphuric acid, and bleaching the fine particle size fraction with a dithionite bleaching agent at a pH reduced to a value in the range 2.5 to 3.5, preferably in the range 2.6 to 3.0, with a mineral acid, e.g. sulphuric acid.

The blending of the aqueous suspensions of calcium carbonate pigment and clay pigment is advantageously carried out under conditions such that there is dissipated in the mixed suspensions at least 5 horsepower hours of energy per ton of dry pigment. The apparatus used to effect the blending of the two suspensions should be such as will dissipate large amounts of energy in the suspension. A suitable apparatus is one which comprises a tank provided with an impeller of the propeller, turbine r toothed disc type which is rotated at a speed of at least 100 r.p.m. A shroud may be provided round the impeller to increase the rate of shear. An example of a suitable apparatus is that known as the "Lightnin'" mixer. The proportions of the two suspensions used will depend on the relative proportions of the two pigments required in the final mixed calcium carbonate/clay pigment. Generally, the mixed pigment will contain not more than about 75% by weight of the calcium carbonate pigment. The blend of the aqueous suspensions will generally have a pH greater than 7.0, but preferably less than about 8.0.

The dewatering of the blended aqueous suspensions is advantageously carried out by pressure filtering, for example, in a tube pressure filter, such as that disclosed in Belgian patent specification No. 717,264 (or in British patent application No. 30,158/67), or in plate filter press. However, it is also possible to use a vacuum filter or a centrifuge. It is generally found that when using pressure-filtering methods to dewater the blended aqueous suspension the pressure which has to be applied to the material in the pressure filter is in the range of from 80 p.s.i.g. to 2000 p.s.i.g. and with the use of pressures of this order it is possible to obtain a filtercake which has a water content in the range of from 32% to 22% by weight. With a water content of this order the cake, however obtained, is advantageously dried, for example in a conventional drier such as a rotary kiln drier, a turbotray drier or, preferably, a fluidised bed drier. The amount of water removed from the cake is preferably such that the dried product contains from 1% to 15% by weight of water. When using a rotary kiln drier or a turbotray drier, it is preferable for the feed material to have a water content in the range 20 to 24% by weight, in which state it is less sticky and less likely to form large lumps in the drier, and this can be assisted by mixing with the cake, when necesary, already dried material. When using a turbotray drier or fluidised bed drier, it is also advantageous to pelletise the feed material before drying, a suitable type of pelletiser being disclosed in, for example, U.S. patent specification No. 2,306,-698 or British patent specification No. 940,813. The material which is fed to the pelletiser should have. a water content in the range 21% to 23% by weight since, if the material contains less water than 21%, excessive dust is formed and if there is more than 23% by weight of water present the material tends to be sticky and the pellets formed are too large. Alternatively, when using a fluidised bed drier, the cake can be extruded into the drier in the form of spaghetti-like strings which are sub-divided by the action of the fluidised bed, assisted if necessary by a mechanical stirrer. The feed to the extruder will have a water content in the range 20% to 35% by weight. The use of a fluidised bed drier is preferred because it yields a product which is more easily redispersed in water, has a lower proportion of particles larger than 53 microns, and tends to have a whiter colour.

It is possible to omit the drying stage if the dewatering is carried out under conditions which reduce the water content of the cake to a sufficiently low level, say 15% by weight or less of water. One advantage of the present invention is that it is readily possible to dewater the blended suspension using a tubular pressure filter or a plate filter press. The fully deflocculated aqueous suspension produced in the known processes, on the other hand, cannot be dewatered readily in this manner. Thus, whilst it is possible to thicken by pressure filtrations a fully deflocculated suspension containing about 70% by weight of solids to about 80% by weight of solids thus takes about twice as long as dewatering a suspension in accordance with the invention from 15% by weight of solids to about 80% by weight of solids.

Figure 2:
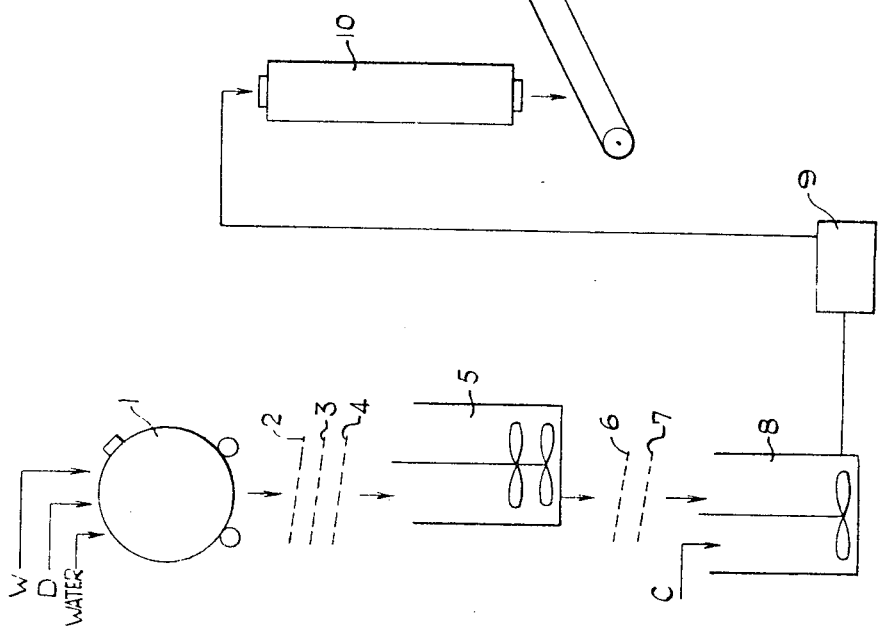

For a better understanding of the invention and to show more clearly how the same may be carried into effect, reference will now be made, by way of example, to the accompanying drawings in which:

FIG. 1 shows diagrammatically one embodiment of an installation suitable for carrying out the method of the invention; and FIG. 2 shows diagrammatically a second embodiment of an installation suitable for carrying out the method of the invention.

Referring first to FIG. 1, raw natural chalk whiting (W) containing flint impurities, a sodium polyacrylate dispersing agent (D), and water are introduced into a pebble mill 1 containing pebbles ranging in size from 2 to 4 inches. The mixture is ground for 15 minutes so that the particles of chalk whiting pass into suspension leaving the particles of hard flint. The suspension of chalk whiting is then passed through a series of three sieves, 2, 3 and 4, of which sieve 2 has a nominal aperture of ¼ inch, sieve 3 is a No. 10 mesh B.S. sieve and sieve 4 is a No. 60 mesh B.S. sieve. The sieved suspension is then further ground in a sand grinding mill 5, using a grinding medium consisting of particles of sand ranging in size from No. 30 mesh B.S. sieve to No. 10 mesh B.S. sieve, for a time sufficient to give the chalk whiting a particle size distribution such that 80% by weight thereof consists of particles smaller than 2 microns equivalent spherical diameter. The deflocculated suspension of ground chalk whiting is then passed through two further sieves 6 and 7, of which sieve 6 is a No. 100 mesh B.S. sieve and sieve 7 is a No. 300 mesh B.S. sieve, into a blending vessel 8. An aqueous flocculated suspension of fine kaolin clay (C) is also fed into the blending vessel 8, and the two suspensions are then blended together in the required proportions in the vessel 8.

After being blended together in vessel 8 for about 60 minutes the blended suspensions are fed by means of a high pressure pump 9 to a tube pressure filter 10 which is constructed as described in Belgian patent specification No. 717,264. The resultant filter cake is conveyed by means of an endless conveyor 11 to a Z-blade mixer 12. (It will be appreciated that pressure filter 10 could be positioned so as to discharge directly into the Z-blade mixer 12.) The Z-blade mixer 12 discharges into a pin-type pelletiser 13 and the pellets which are formed fall onto the top tray of a turbotray drier 14.

If the filter cake produced by the tube pressure filter 10 has a water content of more than 23% by weight, dried mixed pigment is recycled to the Z-blade mixer 12 by the route 15 in the quantity required to give the material discharged from the mixer a water content in the range 21–23% by weight. If, on the other hand, the filter cake contains less than 21% by weight of water, additional water is added to the Z-blade mixer.

Referring now to FIG. 2, the apparatus required to produce the filter cake is similar to that described above with reference to FIG. 1, but instead of being fed to a turbotray drier the cake is fed to a fluidised bed drier. More particularly, the filter cake is conveyed by means of the endless conveyor 11 to an extruder 42 provided with a helical screw 43 which is driven by an electric motor 21. The filter cake is forced through a perforated plate 22 into a fluidising vessel 44 thus forming a plurality of spaghetti-like strings which are broken up by the action of the fluidised bed assisted by a stirrer blade 23 mounted on a shaft 24 which is rotated by means of an electric motor 25. Hot fluidising gases are generated in a combustion chamber 26 and pass upwards through a foraminous distribution plate 27. Fuel oil and primary air are supplied to the combustion chamber 26 through conduits 28 and 29, respectively, and secondary air for making up the volume required for fluidising is supplied through a conduit 30. The substantially dry product leaves the fluidised bed through a conduit 31, the exit from which is controlled by a valve 35. The fluidising gases containing some entrained dust pass out of the fluidising vessel 44 into a cyclone 32 where the entrained dust is separated and leaves the cyclone through a conduit 33 controlled by a valve 34. Some or all of the cyclone dust may be mixed with the filter cake in the extruder 42, provided that the mixture formed thereby does not contain less than 20% by weight of water as this represents the minimum water content of a mixture which can be extruded.

The invention is further illustrated by the following examples in which there was used an installation similar to that described above with reference to FIG. 1.

EXAMPLE 1

2032 kg. of raw natural chalk whiting, as mined, containing 20% by weight of water were loaded into a pebble mill containing 4064 kg. of Chesil beach pebbles approximately 50 to 100 mm. in diameter, together with 363 litres of water and an aqueous solution of a dispersing agent which is a sodium salt of a polyacrylic acid having a number average molecular weight of 1650, the solution of dispersing agent comprising 2.27 kg. of sodium polyacrylate (calculated on a dry weight basis) and 3.50 kg. of water so that there was used about 0.14 wt. percent of sodium polyacrylate based on the weight of dry chalk whiting. The solids content of the mixture was 68% by weight. The mixture was ground in the pebble mill for 15 minutes after which time it was screened through a series of sieves having apertures of ¼ inch, No. 10 mesh B.S. sieve and No. 60 mesh B.S. sieve in order to separate the aqueous suspension of chalk whiting from particles of hard flint.

The aqueous suspension of chalk whiting was then ground for a further 22 hours in a pebble mill, using as the grinding medium pebbles having sizes in the range ¼ to ½ inch, after which time the chalk whiting had a particle size distribution such that 80% by weight consisted of particles smaller than 2 microns equivalent spherical diameter. The aqueous suspension was then screened through a No. 100 mesh B.S. sieve followed by a No. 300 mesh B.S. sieve to remove the particles of grinding medium and other impurities.

There was prepared a second aqueous suspension comprising a fine kaolin clay (the properties of which were such that a fully deflocculated aqueous suspension having a viscosity of 5 poise at 22° C. corresponded to a solids concentration of 67% by weight) having a particle size distribution such that 80% by weight consisted of particles smaller than 2 microns equivalent spherical diameter. The aqueous suspension had a pH of 4.5 and contained 27% by weight of dry kaolin clay.

5000 litres of the second aqueous suspenusion, i.e. that quantity which contained 1620 kg. of dry kaolin clay, was pumped into a blunger and the aqueous chalk whiting suspension was added to it with stirring which was continued for a total time of 60 minutes. At the end of this time the mixture was seen to be well flocculated and free from lumps. The blended suspensions were then fed to a recessed plate filter press wherein the blend was filter-pressed at a pressure of 120 p.s.i.g. to form a filter cake which contained 27.7% by weight of water. This filter cake was mixed in a Z-blade mixer with already dried material to give a material containing 21% by weight of water. The latter material was formed into pellets in a pin-type pelletiser and the pellets were dried in a turbotray drier to give a mixed pigment having a water content of 10% by weight.

The behaviour of the dried mixed pigment on storage was examined by storing it in paper bags under ambient conditions in the laboratory and testing for particle size and the solids concentration of a fully deflocculated aqueous suspension having a 5 poise viscosity at 22° C., after storage for different lengths of time. The results obtained are given in Table I below.

TABLE 1

| Material | Percent by wt. of particles | | 5 poise viscosity, solids concentration (wt. percent) [1] |
|---|---|---|---|
| | Larger than 10 microns e.s.d. | Smaller than 2 microns e.s.d. | |
| Original mixed pigment | 0.04 | 84 | 72.9 |
| Mixed pigment after storing for 3 weeks | 0.06 | 82 | 74.2 |
| Mixed pigment aftering storing for 8 weeks | 0.05 | 84 | 74.1 |

[1] The 5 poise viscosity, solids concentration represents the percentage by weight of dry, mixed pigment in a fully deflocculated aqueous suspension of the mixed pigment which had a viscosity of 5 poise at 22° C. as measured by a Brookfield Viscometer using Spindle 3 and Speed 100.

From these results it can be seen that prolonged storage had no detrimental effect on the properties of the mixed pigment. There was in fact a small but significant improvement in the rheological properties whereas no such improvement is observed when similar tests are carried out on a spray dried mixed pigment.

The effect of prolonged storage upon the optical properties of the mixed pigment, when incorporated in a paper coating composition, was investigated by preparing three paper coating compositions comprising, respectively, the original mixed pigment, the mixed pigment after storing for 3 weeks and the mixed pigment after storing for 8 weeks. Each paper coating composition comprised 900 g. of the dry mixed pigment, 67.5 g. of an oxidised potato starch sold under the trademark Viscosal 310, 141 ml. of a styrene/butadiene latex manufactured and sold by the Dow Chemical Company Ltd. as Styrene/Butadiene latex No. 636 (which quantity comprises 67.5 g. of solids), 1.35 g. of a tetrasodium pyrophosphate dispersing agent (which corresponds to 0.15% by weight of dispersing agent based on the weight of dry mixed pigment), 9.0 ml. of a solution of sodium polyacrylate containing 10 g. of sodium polyacrylate dispersing agent per 100 ml. solution (which corresponds to 0.10% by weight of dispersing agent based on the weight of dry mixed pigment), 9.0 ml. of a sodium hydroxide solution containing 10 g. of NaOH per 100 ml. of solution, and 477 ml. of water.

The coating compositions were applied to sheets of wood-free trailing blade coating base paper, using a trailing blade apparatus of the type disclosed in British patent specification No. 1,032,536, at a loading of 10 g. of dry coating composition per square metre of paper. The dried, coated sheets of paper were then tested for gloss by the method specified in TAPPI Standard No. T-480 ts-65 in which the intensity of the light reflected at 75° from the specimen of paper (15° from the plane of the paper) is compared with that of the light reflected at 75° from a high-glass standard, to which is assigned the value of 100 TAPPI gloss units, in the form of a clean plaque of polished black glass of refractive index 1.540 as measured for the sodium D line. The results obtained are given in Table II below.

TABLE II

| Material: | Gloss (TAPPI units) |
|---|---|
| Original mixed pigment | 41 |
| Mixed pigment after storing for 3 weeks | 44 |
| Mixed pigment after storing for 8 weeks | 39 |

These results show that, within the limits of experimental error, prolonged exposure of the mixed pigment to ambient conditions has no detrimental effect on the optical properties of the pigment. On the other hand, it is found that prolonged exposure of a spray-dried mixed pigment does result in a small, but significant, deterioration in the optical properties of the mixed pigment.

EXAMPLE 2

A second batch of mixed pigment was prepared and dried by the method described in Example 1 from the same aqueous suspension of raw natural chalk whiting, and from an aqueous suspension having a pH of 4.5 of a fine kaolin clay (the properties of which were such that an aqueous suspension having a viscosity of 5 poise corresponded to a solids concentration of 69% by weight) having a particle size distribution such that 80% by weight consisted of particles smaller than 2 microns equivalent spherical diameter.

The dried, pelletised mixed pigment containing 10% by weight of water was dispersed in water containing 0.15% by weight of tetrasodium pyrophosphate and 0.10% by weight of sodium polyacrylate dispersing agents based on the weight of dry mixed pigment.

The solids concentration of a suspension having a viscosity of 5 poise was determined and, in order to determine the effect of storage upon the rheological properties of the suspension, the viscosity at 22° C. of a suspension containing 70% by weight of solids was determined initially, after storage for 1 day and after storage for 7 days.

For comparison, a mixed pigment was made from the same two raw materials as above but prepared by blending a deflocculated aqueous suspension of the chalk whiting, and a deflocculated aqueous suspension of the kaolin clay and then spray drying the blended suspension to give a dry product containing 1% by weight of water, and was subjected to the same tests. The total quantities of tetrasodium pyrophosphate and sodium polyacrylate present in the aqueous suspension of the mixed pigment prepared in this manner were the same as for the mixed pigment prepared in accordance with the invention. The results obtained are shown in Table III below.

TABLE III

| Material | 5 poise viscosity, solids concentration (wt. percent) | Viscosity at 22° C. of 70% mixed pigment suspension (centipoise) | | |
|---|---|---|---|---|
| | | Initial | After 1 day | After 7 days |
| Mixed pigment prepared in accordance with the invention | 73.5 | 170 | 200 | 230 |
| Mixed pigment prepared by conventional spray-drying process | 73.0 | 210 | 600 | 680 |

EXAMPLE 3

A further batch of mixed pigment was prepared and dried by the method described in Example 1 from the same aqueous suspension of raw natural chalk whiting and from the aqueous suspension of kaolin used in Example 2. However, in this case the two suspensions were mixed in proportions such that there was present in the blended suspension 75 parts by weight of dry kaolin to 25 parts by weight of dry chalk whiting.

Samples of the dried, pelletised mixed pigment containing 10% by weight of water were dispersed in water containing different quantities of tetrasodium pyrophosphate (T.S.P.P.) and sodium polyacrylate dispersing agents based on the weight of dry mixed pigment.

The solids concentration of a suspension having a viscosity of 5 poise at 22° C. was determined for each sample and, in order to determine the effect of storage upon the rheological properties of each sample in suspension, the viscosity at 22° C. of a suspension containing 70% by weight of solids was determined initially and after storage for 1 hour and 1 day for each sample.

The results obtained are shown in Table IV below:

TABLE IV

| Dispersing agent dose (wt. percent on total pigment) | 5 poise viscosity concentration (wt. percent) | Viscosity at 22° C. of 70% mixed pigment suspension (centipoise) | | |
|---|---|---|---|---|
| | | Initial | After 1 hr. | After 24 hrs. |
| 0.15% TSPP / 0.10% polyacrylate | 70.8 | 345 | 460 | 570 |
| 0.20% TSPP / 0.10% polyacrylate | 69.8 | 426 | 570 | 1,450 |
| 0.25% TSPP / 0.05% polyacrylate | 70.9 | 394 | 546 | 1,900 |
| 0.10% TSPP / 0.20% polyacrylate | 71.5 | 424 | 480 | 860 |
| 0.30% polyacrylate | 70.3 | 365 | 475 | 840 |

These results show that the suspension of mixed pigment having the best rheological stability is obtained when the mixed pigment is deflocculated with tetrasodium pyrophosphate and sodium polyacrylate in the proportions 3 parts by weight of tetrasodium pyrophosphate to 2 parts by weight of sodium polyacrylate.

EXAMPLE 4

A mixed pigment was prepared and dried from a suspension of kaolin at pH 4.5 and a suspension of ground vein calcite which had been deflocculated with 0.3% by weight of sodium polyacrylate dispersing agent. The kaolin had a particle size distribution such that 75% by weight consisted of particles smaller than 2 microns equivalent spherical diameter, 0.4% by weight of particles larger than 10 microns equivalent spherical diameter and 0.01% by weight of particles larger than 53 microns. 95% by weight of the ground vein calcite consisted of particles smaller than 2 microns equivalent spherical diameter. The two suspensions were mixed in proportions such that there were present in the suspension 70 parts by weight of dry kaolin to 30 parts by weight of dry ground vein calcite.

Samples of the dried pelletised mixed pigment containing 10% by weight of water were dispersed in water containing different quantities of tetrasodium pyrophosphate (TSPP) and sodium polyacrylate dispersing agents based on the weight of dry mixed pigment.

In order to determine the effect of storage upon the rheological properties of each sample in suspension, the viscosity at 22° C. of a suspension containing 72% by weight of solids was determined initially and after storing for 1 hour, 24 hours and 168 hours for each sample.

The results obtained are shown in Table V below:

TABLE V

| Dispersing agent dose (wt. percent on total pigment) | Viscosity at 22° C. of 72% mixed pigment suspension (centipoise) | | | |
|---|---|---|---|---|
| | Initial | After 1 hr. | After 24 hrs. | After 168 hrs. |
| 0.15% TSPP <br> 0.10% polyacrylate } | 560 | 930 | 1,820 | 2,040 |
| 0.30% polyacrylate | 410 | 500 | 970 | 1,500 |
| 0.20% polyacrylate | 850 | 1,760 | | |

These results show that in the case of mixtures of vein calcite and kaolin it is preferable to redisperse the dried mixed pigment with sodium polyacrylate dispersing agent alone.

EXAMPLE 5

A mixed pigment was prepared using as the calcium carbonate pigment an Italian calcite marble which was first crushed to lumps in the size range ¼–½ inch (6–13 mm.). The lumps were then ground with flint pebbles of size 2–3 inches (50–75 mm.) in a rubber-lined pebble mill for a time of 7½ hours after which time the ground product was sieved through a No. 16 mesh B.S. sieve (1 mm. aperture). The ground product was then more finely ground in a sand grinding mill. The mixture in the sand grinding mill comprised 5.0 kg. of dry calcite marble, 10 kg. of silica sand comprising particles of sizes in the range 0.5–1.0 mm., 2 litres of water and 0.3% by weight, based on the weight of dry calcite marble, of an ammonium polyacrylate dispersing agent. The solids content of the aqueous suspension of calcite marble was 71.5% by weight of dry calcite marble. After grinding for a total time of 37 minutes the suspension of calcite marble was separated from the sand and the particle size distribution was found to be such that 75% by weight consisted of particles smaller than 2 microns equivalent spherical diameter, 0.8% by weight of particles larger than 10 microns equivalent spherical diameter and 0.02% by weight larger than 53 microns.

There was prepared a second aqueous suspension comprising a fine kaolin clay having a particle size distribution such that 77% by weight consisted of particles smaller than 2 microns equivalent spherical diameter, 0.6% by weight of particles larger than 10 microns equivalent spherical diameter and 0.02% by weight of particles larger than 53 microns. The suspension was well flocculated, had a pH of 4.5 and contained 15% by weight of dry kaolin clay.

The two suspensions were thoroughly mixed in proportions which gave equal weights of the two pigments in the mixture, and the blended suspension was pressure filtered and the cake dried in a fluidized bed drier. The pellets of mixed pigment produced by the fluidised bed drier were then further dried and milled in a heated impact mill which yielded a fine powder containing less than 1% by weight of water.

The dry mixed pigment of calcite marble and kaolin was then incorporated in a styrene-butadiene rubber composition to produce a blend having the following composition:

| Ingredients: | Parts by weight |
|---|---|
| Styrene-butadiene rubber | 100 |
| Pine tar | 3 |
| Zinc oxide | 5 |
| Stearic acid | 1 |
| Accelerators: | |
|   Cyclohexylbenzthiazylsulphenamide | 2 |
|   Diphenylguanidine | 0.2 |
| Sulphur | 2 |
| Anti-oxidant: phenyl-β-naphthylamine | 1 |
| Calcite marble/kaolin mixed pigment | 130 |

The blend was prepared and cured for 20 minutes at 153° C. Samples of the cured rubber were tested for modulus at 300% extension, tensile strength, elongation at break and hardness measured in terms of International Rubber Hardness Degrees (IRHD). These tests were performed in accordance with BS 903. The results are shown in Table VI below:

TABLE VI

| Modulus at 300% extension (lb.f./in.²) | Tensile strength (lb.f./in.²) | Elongation at break (percent) | Hardness (IRHD) |
|---|---|---|---|
| 413 | 1,225 | 690 | 73.0 |

I claim:
1. In a method of preparing a mixed pigment by blending together an aqueous suspension of a calcium carbonate pigment and an aqueous suspension of a clay pigment, the improvement which comprises (a) incorporating a dispersing agent for the calcium carbonate pigment in the aqueous suspension of the calcium carbonate pigment before said aqueous suspension of the calcium carbonate pigment is blended with the aqueous suspension of the clay pigment and (b) adjusting the pH of the aqueous suspension of the clay pigment to be not greater than 6.5 whereby the clay pigment is flocculated before the aqueous suspension of the clay pigment is blended with the aqueous suspension of the calcium carbonate pigment, and dewatering the blended aqueous suspensions to obtain a cake of the desired mixed pigment.

2. A method according to claim 1, wherein said calcium carbonate pigment is chosen so as to have a particle size distribution such that from 65% to 95% by weight thereof consists of particles smaller than 2 microns equivalent spherical diameter, not more than 10% by weight thereof consists of particles larger than 10 microns equivalent spherical diameter and not more than 1% by weight thereof consists of particles larger than 53 microns equivalent spherical diameter.

3. A method according to claim 1, wherein said deflocculated aqueous suspension of a calcium carbonate pigment comprises from 60% to 75% by weight of solids.

4. A method according to claim 1, wherein the dispersing agent for the calcium carbonate pigment is a non-mucilaginous water-soluble salt having a macromolecular anion with a number average molecular weight in the range of from 100 to 10,000.

5. A method according to claim 4, wherein the dispersing agent for the calcium carbonate pigment is selected from the group consisting of sodium, potassium and ammonium salt of an acid selected from the group consisting of a polyacrylic acid and a polymethacrylic acid.

6. A method according to claim 4, wherein the aqueous suspension of calcium carbonate pigment contains from 0.1% to 1.0% by weight of the dispersing agent based on the weight of dry calcium carbonate pigment.

7. A method according to claim 1, wherein the clay pigment is a kaolinitic clay.

8. A method according to claim 7, wherein the aqueous suspension of clay pigment comprises from 10% to 30% by weight of solids.

9. A method according to claim 7, wherein the pH of the aqueous suspension of the clay pigment is adjusted to lie in the range of from 2.5 to 5.5.

10. A method according to claim 7, wherein the clay pigment is chosen so as to have a particle size distribution such that from 50% to 90% by weight thereof consists of particles smaller than 2 microns equivalent spherical diameter, not more than 15% by weight thereof consists of particles larger than 10 microns equivalent spherical diameter and not more than 0.05% by weight thereof consists of particles larger than 53 microns.

11. A method according to claim 1, wherein the deflocculated suspension of the calcium carbonate pigment and the aqueous suspension of the clay pigment are blended together under conditions such that there is dissipated in the mixed suspension at least 5 horsepower hours of energy per ton of dry pigments.

12. A method according to claim 1, wherein the amount of the deflocculated aqueous suspension of the calcium carbonate pigment and of the aqueous suspension of the clay pigment which are employed are such that the mixed pigment contains not more than about 75% by weight of the calcium carbonate pigment.

13. A method according to claim 1, wherein the blended aqueous suspensions are dewatered in a pressure-filter at a pressure in the range of from 80 p.s.i.g. to 2000 p.s.i.g.

14. A method according to claim 1, wherein the cake of mixed pigment is dried to a water content in the range of from 1% to 15% by weight.

References Cited
UNITED STATES PATENTS

| | | | |
|---|---|---|---|
| 3,085,894 | 4/1963 | Rowland | 106—306 |
| 3,130,063 | 4/1964 | Millman et al. | 106—288 B |

JAMES E. POER, Primary Examiner

U.S. Cl. X.R.

106—288 B, 308 B, 308 Q